UNITED STATES PATENT OFFICE.

ALFRED EINHORN, OF MUNICH, GERMANY, ASSIGNOR TO FARBWERKE VORM. MEISTER LUCIUS & BRÜNING, OF HÖCHST-ON-THE-MAIN, GERMANY, A CORPORATION OF GERMANY.

DIAMINOBENZOIC-ACID ALKAMIN ESTER.

No. 907,017.      Specification of Letters Patent.      Patented Dec. 15, 1908.

Application filed September 19, 1907. Serial No. 393,583. (Specimens.)

*To all whom it may concern:*

Be it known that I, ALFRED EINHORN, a citizen of the Empire of Germany, residing at Munich, Germany, have invented certain new and useful Improvements in Diaminobenzoic-Acid Alkamin Esters, of which the following is a specification.

I have found new alkamin esters which are derived from meta-para-diaminobenzoic acid or its alkyl derivatives corresponding to the following formula

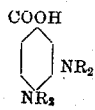

wherein "R" means alkyl or hydrogen. The alkamin esters of these acids are valuable as medicaments being characterized by a powerful anesthetic action. These compounds are little soluble in water, but readily soluble in alcohol, ether, and benzene, forming hydrochlorids readily soluble in water with neutral action and from which alkalies separate the alkamin esters. These esters are hydrolized on boiling with free alkali and meta-para-diaminobenzoic acid or its alkyl derivatives are formed. The new alkamin esters of said acids may be obtained, for instance, by heating the acids with an alkamin in concentrated sulfuric acid.

The process may be carried out, for instance, as follows:—15 parts by weight of meta-para-diaminobenzoic acid and 30 parts by weight of diethylaminoethanol are introduced while well cooling into 150 parts of concentrated sulfuric acid. The mixture is heated on the water-bath for from 5-6 hours and the solution is then poured on ice, made alkaline with ammonia and saturated with potash and shaken with ether. The ethereal solution thus obtained is washed with water to remove any diethylaminoethanol and the ether is evaporated. The diaminobenzoic acid diethylaminoethanol ester is then obtained as an oil readily soluble in alcohol, benzene and ether. With the equivalent quantity of hydrochloric acid it forms a monohydrochlorid readily soluble in water with a neutral reaction and crystallizing from alcohol in form of needles which melt at 163° C.

The alkamin ester has the formula:

$(NH_2)2C_6H_3CO.OC_2H_4N(C_2H_5)_2$ and is formed according to the equation:

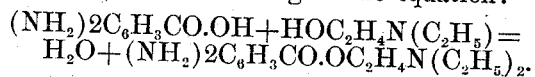
$H_2O + (NH_2)2C_6H_3CO.OC_2H_4N(C_2H_5)_2.$

On boiling the ester with caustic soda-lye, the sodium salt of meta-para-diaminobenzoic acid is obtained, besides alkamin.

The product claimed is used for local anesthesia and is administered in ¼—½—1— and 2 per cent. solutions, the ¼ and ½ per cent. solutions being employed in quantities up to 100 c.c. for infiltration anesthesia, and the 1 and 2 per cent. solutions in quantities of from 1-10 c.c. for central conductive anesthesia.

Having now described my invention, what I claim is:—

1. As products, the alkamin esters of meta-para-diaminobenzoic acid and alkyl derivatives thereof, having the constitution

wherein "R" means alkyl and hydrogen and "X" the radical of an alkamin, being compounds little soluble in water, but readily soluble in alcohol, benzene and ether, forming in water readily soluble hydrochlorids of neutral reaction from which alkalies liberate the alkamin esters which on boiling with free alkalies are hydrolized with formation of the corresponding acids; the alkamin esters having a local anesthetic action.

2. As a new product, the meta-para-diaminobenzoic acid diethylamino-ethanol ester having the formula:

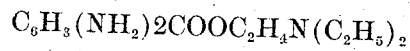

being an oil little soluble in water, readily soluble in alcohol, ether and benzene, yielding when boiled with caustic soda-lye the sodium salt of meta-para-diaminobenzoic acid, forming a monochlorhydrate which melts at 163° C. and which separates the alkamin ester on addition of potash, the aqueous solution of the monochlorhydrate being of neutral reaction and acting as a local anesthetic.

In testimony, that I claim the foregoing as my invention, I have signed my name in presence of two subscribing witnesses.

ALFRED EINHORN.

Witnesses:
  ABRAHAM SCHLESINGER,
  LOUIS F. MUELLER.